(12) United States Patent
Lavine

(10) Patent No.: US 12,110,077 B2
(45) Date of Patent: Oct. 8, 2024

(54) COMPUTERIZED BICYCLE PEDAL LOCK-IN AND RELEASE SYSTEM AND METHOD

(71) Applicant: Michael Andrew Lavine, San Francisco, CA (US)

(72) Inventor: Michael Andrew Lavine, San Francisco, CA (US)

( * ) Notice: Subject to any disclaimer, the term of this patent is extended or adjusted under 35 U.S.C. 154(b) by 234 days.

(21) Appl. No.: 17/358,020

(22) Filed: Jun. 25, 2021

(65) Prior Publication Data
US 2021/0403123 A1     Dec. 30, 2021

Related U.S. Application Data

(60) Provisional application No. 63/044,155, filed on Jun. 25, 2020.

(51) Int. Cl.
*B62M 3/08*       (2006.01)
*B62J 45/20*      (2020.01)
(Continued)

(52) U.S. Cl.
CPC .............. *B62M 3/086* (2013.01); *B62J 45/20* (2020.02); *B62J 45/412* (2020.02); *B62J 45/4151* (2020.02); *G01C 19/00* (2013.01); *G01P 15/00* (2013.01); *H04Q 9/00* (2013.01); *H04Q 2209/30* (2013.01); *H04Q 2209/43* (2013.01)

(58) Field of Classification Search
CPC ........ B62M 3/08; B62M 3/083; B62M 3/086; B62M 3/10; B62M 3/12; B62J 45/20; B62J 45/40; B62J 45/41; B62J 45/412; B62J 45/415; B62J 45/4151; G01C 19/00; G01P 15/00; H04Q 2209/30; H04Q 2209/43
See application file for complete search history.

(56) References Cited

U.S. PATENT DOCUMENTS 4,803,894 A   *   2/1989   Howell ..................... A43B 5/14
                                                                   36/131
5,852,955 A   *   12/1998   Crisick ................... B62M 3/086
                                                                   74/594.6

(Continued)

FOREIGN PATENT DOCUMENTS

KR          20170044843 A   *   4/2017   ............ B62M 3/086

OTHER PUBLICATIONS

"Wireless," Wikipedia Page, dated by Wayback Machine to Feb. 17, 2020, url:<https://web.archive.org/web/20200217060843/https://en.wikipedia.org/wiki/Wireless>.*

(Continued)

*Primary Examiner* — Thomas C Diaz
(74) *Attorney, Agent, or Firm* — Michael Lavine

(57) ABSTRACT

Systems and methods for ensuring safe gripping or locking and release of a cyclist's shoe by a bicycle pedal are disclosed. The system may comprise a computing device, one or more sensors for detecting change of velocity, one or more sensors for detecting a change of angle of the bicycle, and a pedal with one or more retractable members. The retractable member may be configured to grip or lock in a cyclist's shoe by extending to interlock with a portion or a cavity of the cyclist's shoe, or to release the cyclist's shoe by retracting on receiving a command from the computing device based on inputs from the one or more sensors.

7 Claims, 9 Drawing Sheets

(51) Int. Cl.
*B62J 45/412* (2020.01)
*B62J 45/415* (2020.01)
*G01C 19/00* (2013.01)
*G01P 15/00* (2006.01)
*H04Q 9/00* (2006.01)

(56) References Cited

U.S. PATENT DOCUMENTS

| | | | |
|---|---|---|---|
| 9,038,502 B2 * | 5/2015 | Zoumaras | B62J 25/04 |
| | | | 74/594.6 |
| 9,650,061 B2 * | 5/2017 | Katayama | A61H 3/04 |
| 9,771,029 B2 * | 9/2017 | Lytle | B62H 7/00 |
| 9,969,451 B2 * | 5/2018 | Sasaki | B62M 3/086 |
| 10,106,222 B1 * | 10/2018 | Teksler | B62M 5/00 |
| 10,703,434 B2 * | 7/2020 | Kao | B62J 43/30 |
| 2011/0219911 A1 * | 9/2011 | Zoumaras | B62J 25/04 |
| | | | 74/594.6 |
| 2015/0367176 A1 * | 12/2015 | Bejestan | G09B 19/167 |
| | | | 482/9 |
| 2017/0106940 A1 * | 4/2017 | Paick | B62M 6/50 |
| 2018/0186427 A1 * | 7/2018 | Lin | B62M 3/00 |

OTHER PUBLICATIONS

Translation of KR 20170044843 A, obtained from fit database (Year: 2017).*

\* cited by examiner

COMPUTERIZED BICYCLE PEDAL LOCK-IN AND RELEASE SYSTEM AND METHOD

CROSS-REFERENCES TO RELATED APPLICATIONS

This application claims priority to U.S. Provisional Patent Application No. 63/044,155 entitled COMPUTERIZED BICYCLE PEDAL LOCK-IN AND RELEASE SYSTEM AND METHOD filed on Jun. 25, 2020, the disclosure of which is incorporated herein in its entirety.

FIELD OF THE INVENTION

The present invention is generally related to bicycles and bicycle pedals, and in particular to devices and methods for safe operation thereof.

BACKGROUND AND DESCRIPTION OF RELATED ART

Traditional bicycle pedal lock-in and release systems require the cyclist to twist their ankles such that protrusions from their cycling shoes may interlock with one or more cavities in bicycle pedals. A typical bicycle with a cyclist is shown in FIG. 1. Such conventional systems also require the cyclist to twist their ankles to release their shoes from the one or more cavities in the pedals, for example when the cyclist wants to stop their bicycle at a red traffic light, or when the cyclist brakes to avoid hitting a pedestrian or another cyclist.

Moreover, these conventional systems require the cyclist to adjust the tension in the pedals (e.g., by using a screwdriver to tighten or loosen a screw in the pedal) in an effort to control how much ankle-twisting force they must use to lock in and release their shoes from the pedal. These traditional systems risk injury to the cyclist because twisting the ankle repeatedly could cause ankle sprains over time. Also, if the cyclist does not properly time their ankle twists, the cyclist may be unable to lock in their shoe when they start to pedal. Also, improper timing of the ankle twist may prevent the cyclist from releasing their shoe from the pedal in a timely fashion (e.g., before the bicycle stops), and they may fall as a result, while still attached to the bicycle pedal. Also, if the bicycle starts to fall while it is moving at a high speed, the cyclist may be unable to twist their ankle quickly enough to release their shoes from the pedal before the bicycle hits the ground. As a result, the cyclist could be severely injured by the bicycle, and the bicycle itself could be damaged significantly. Using a system that permits the cyclist to lock in and release their shoe based on commands generated by a computing device (either automatically or based on manual input from the cyclist) rather than by twisting their ankles, would help to avoid these injuries.

A bicycle pedal with clamping mechanism for mechanically gripping a shoe is disclosed in U.S. Patent Publication No. 2009/0308196. The clamping mechanism works by gripping the shoe when forward force is exerted on the pedals. Another type of shoe gripping pedal device is disclosed in U.S. Patent Publication No. 2015/0143949, suitable for a bicycle or an exercise machine. The shoe has a T-shaped fastener that goes into an appropriately shaped slot affixed on the pedal. A computer controlled clamping device for a bicycle is disclosed in U.S. Patent Publication No. 2018/0186427. These conventional clamping systems do not provide for timely unclamping of a cyclist's shoe from a bicycle pedal when a bicycle is falling, especially when the bicycle is falling while traveling at high speed. As a result, if a cyclist falls while using a bicycle employing these conventional systems, there is a high likelihood that the cyclist's shoe would be still attached to the bicycle pedal, which could cause significant injury to the cyclist and damage to the bicycle as well.

Therefore, there is a need for a safe way to grip or lock a cycling shoe to a pedal, and a safe way to release a cycling shoe from a pedal, for example when the bicycle is falling.

SUMMARY OF THE INVENTION

The present invention in its various embodiments provides systems and methods for ensuring safe gripping and release of a cyclist's shoe by a bicycle pedal. The system may comprise a computing device, one or more sensors for detecting change of velocity, one or more sensors for detecting a change of angle of the bicycle (including, for example, a change of the angle of the bicycle's frame relative to (a) the surface on which the bicycle is traveling or (b) the vertical axis of the bicycle's frame (i.e., relative to the upright position of the bicycle's frame)), and a pedal with one or more retractable members (shoe grips). The retractable member may be configured to (a) grip or lock-in a cyclist's shoe by, for example, extending to interlock with a portion or a cavity of the cyclist's shoe, or (b) release the cyclist's shoe by retracting, on receiving a command from the computing device based on inputs from the one or more sensors.

In some embodiments, the computing device may be connected to the one or more sensors with a wired or a wireless connection. The wireless connection may use a WiFi protocol or a Bluetooth Low Energy (BLE) protocol. The sensor for detecting change of velocity may comprise an accelerometer. The sensor for detecting the bicycle's change of angle may comprise, for example, a gyroscope.

In various embodiments, the computing device is configured to release the cyclist's shoe based on a decrease in the bicycle velocity exceeding a first threshold value, a rate of decrease in the bicycle velocity exceeding a second threshold value, a change of bicycle angle exceeding a third threshold value, or a rate of change of bicycle angle exceeding a fourth threshold value.

In various embodiments, the system may further comprise a user device with a software interface configured to communicate with the computing device. The interface may be used for setting either the first, second, third or the fourth threshold value, or to issue a command to cause locking or release of the cyclist's shoe from the pedal.

In some embodiments, the retractable member of the pedal comprises two halves that are configured to be driven by a linear mechanism to enable extension or retraction of the shoe grips. In some embodiments, the two halves are configured to be driven a rotary mechanism to cause extension or retraction of the shoe grips.

This and other aspects are described herein.

BRIEF DESCRIPTION OF THE DRAWINGS

The invention has other advantages and features which will be more readily apparent from the following detailed description of the invention and the appended claims, when taken in conjunction with the accompanying drawings, in which:

Referring to the figures, like numbers indicate like parts throughout the views.

DETAILED DESCRIPTION OF THE EMBODIMENTS

Figure 1:
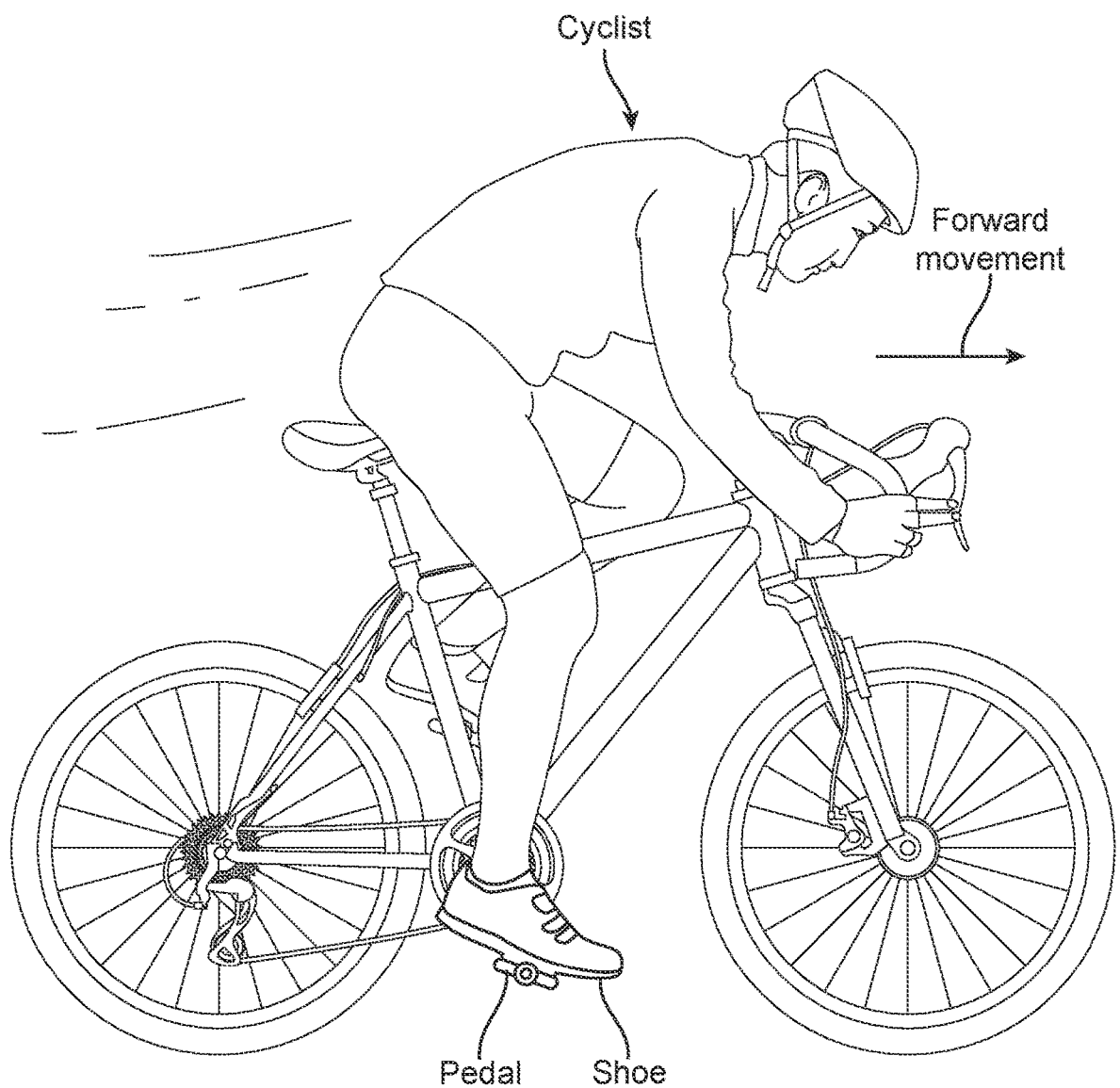
FIG. 1 shows a typical bicycle with a cyclist.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present invention in its various embodiments relates to a system and method for locking a cyclist's shoe to a bicycle pedal and to releasing the shoe in a safe manner as further set forth herein. The locking or unlocking may take place in response to a command signal initiated by input from the cyclist or automatically in response to a command signal initiated by information from a sensor mounted to the cyclist or to the bicycle. In some embodiments, the system may cause the pedal to automatically release the cyclist's shoes from the bicycle pedal in an emergency situation for instance, if the bicycle is falling or when the bicycle is not moving forward after a predetermined period of time.

The invention is further described with reference to the embodiments illustrated in FIG. 2 to FIG. 5D. The system 100 in various embodiments comprises a computing device 101 in communication with at least one pedal 110 and one or more sensors 105-1, 105-2 etc. Each pedal 110 comprises a pedal cavity 115 for receiving a portion of the sole of cyclist's shoe and one or more shoe grips 120. The shoe grips lock the cyclist's shoe in place until the pedal receives a shoe release command from the computing device 101.

Figure 2:
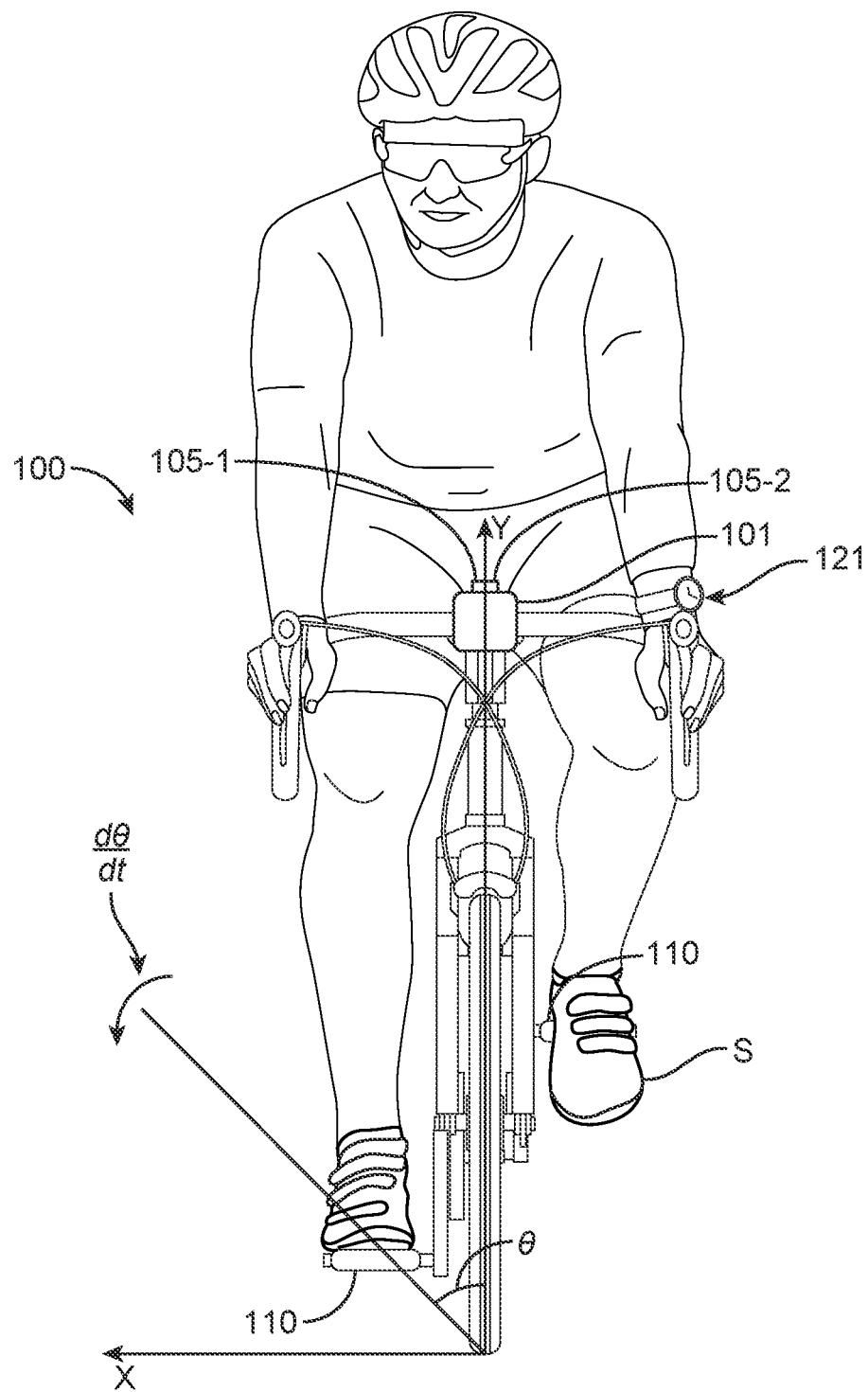
FIG. 2 illustrates a computerized bicycle pedal lock-in and release system, in accordance with an embodiment of the present invention.

The sensor 105-1 may be an accelerometer sensor, and may detect when the bicycle is falling, and when the bicycle's speed or velocity falls below a certain threshold, or when the bicycle comes to a stop. The sensor 105-2 may be an angle detection sensor comprising a gyroscope, and may detect a rate of change of angle $\theta$ with reference to the vertical axis Y. The rate of change of angle may be designated as $d\theta/dt$ as illustrated in FIG. 2. The sensors 105-1 and 105-2 may be connected to the computing device 101 by either wired or wireless connections.

The computing device 101 is provided with a communication module that may be configured to connect with other devices via WiFi or Bluetooth protocol such as BLE. The other devices, including the accelerometer sensor and the angle detection sensor, may be incorporated into either the pedal 110 or a user device such as a mobile phone or a wearable electronic device 121 worn by the cyclist. The mobile phone or wearable device may have a software interface such as an application for allowing the cyclist to enter a command to the device 101 for locking in the shoes to the pedal or for releasing the shoes as described herein. The computing device 101 may also generate these commands automatically based on, for example, signals received form the sensors 105-1 or 105-2.

Figure 3:
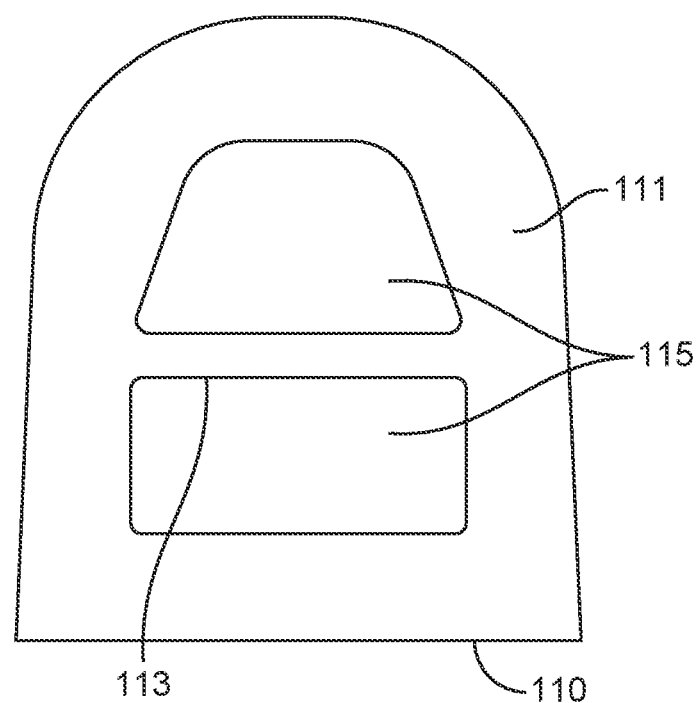
FIG. 3 illustrates a bicycle pedal with various portions used for gripping or locking in the cyclist's shoe, in accordance with an embodiment of the present invention.
Figure 4:
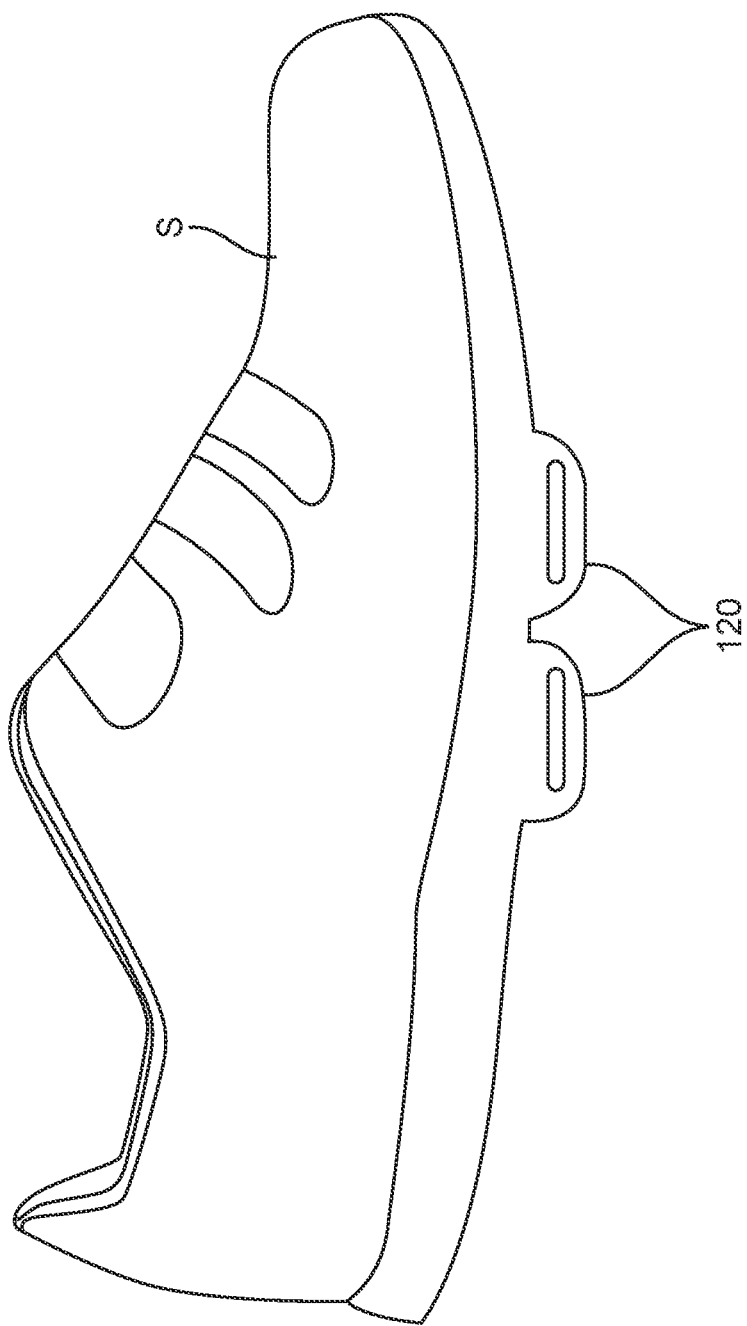
FIG. 4 shows a cyclist's shoe with shoe grips in a released position, in accordance with an embodiment of the present invention.
Figure 5A:
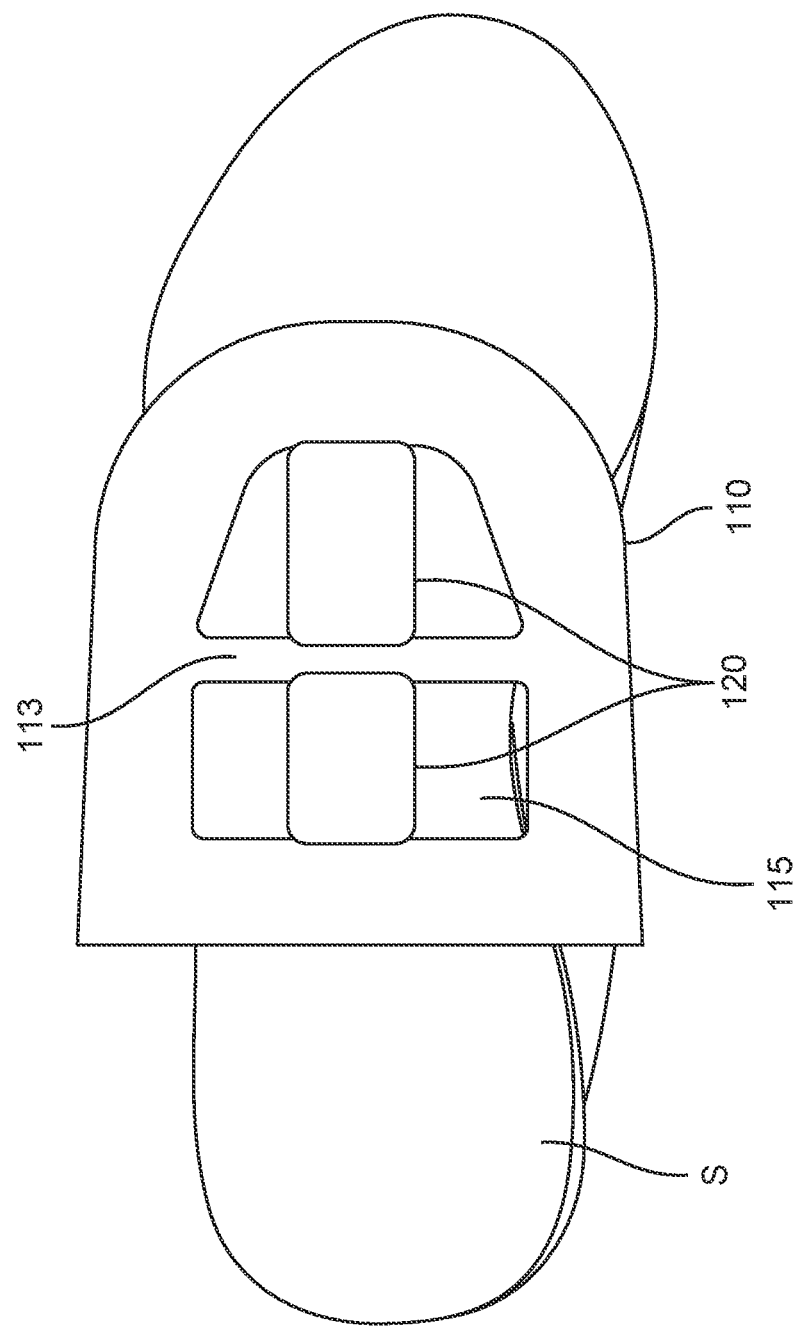
FIG. 5A shows a bottom view of a pedal with shoe grips extending from the cyclist's shoe in a gripped or locked in position, in accordance with an embodiment of the present invention.
Figure 5B:
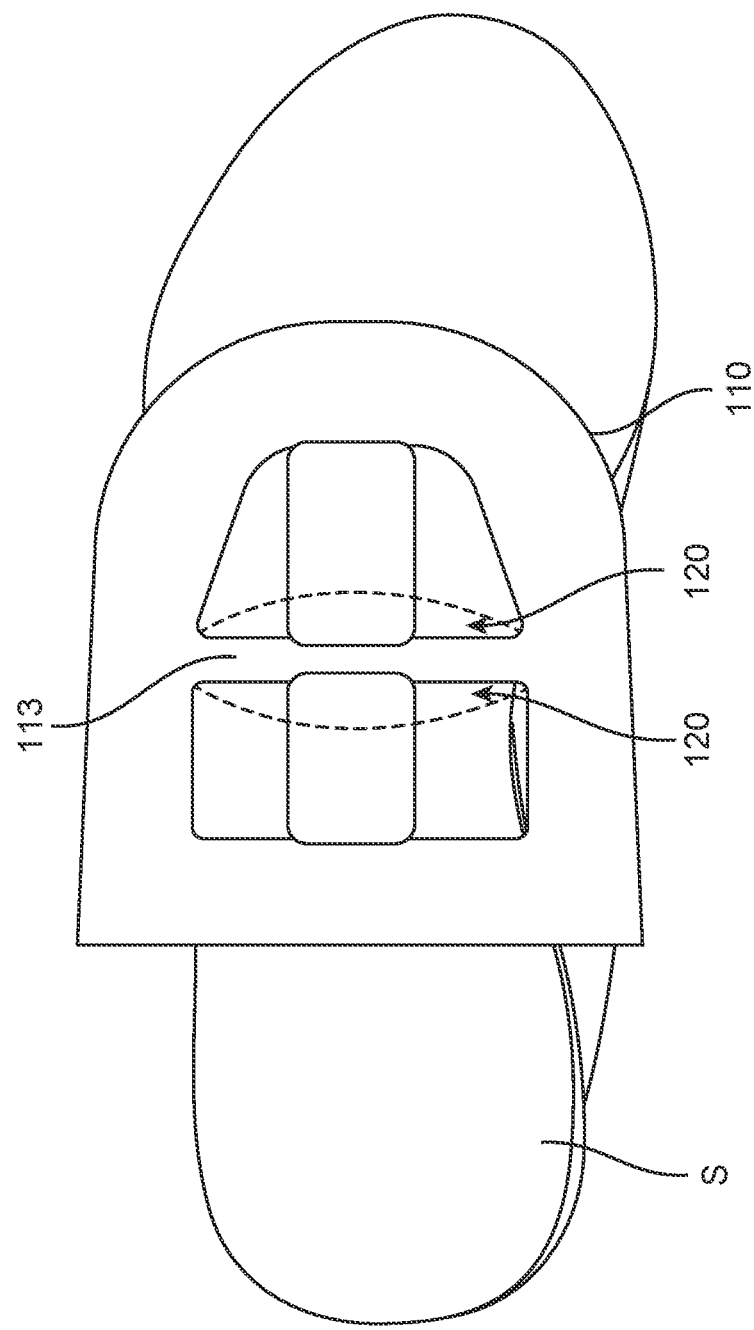
FIG. 5B shows a bottom view of a pedal with shoe grips extending from the pedal in a gripped or locked in position, in accordance with an embodiment of the present invention.
Figure 5C:
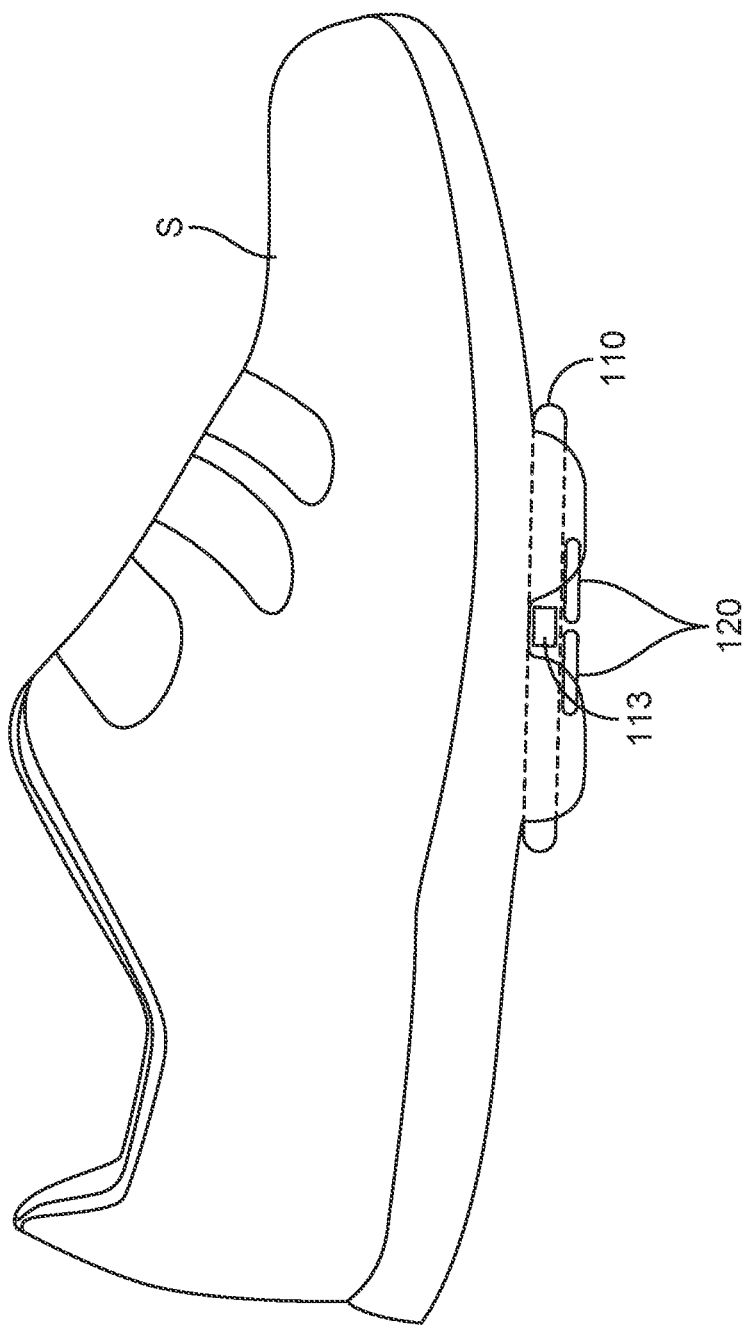
FIG. 5C shows a sideview of a cyclist's shoe and pedal with shoe grips extending from the shoe in a gripped or locked in position, in accordance with an embodiment of the present invention.
Figure 5D:
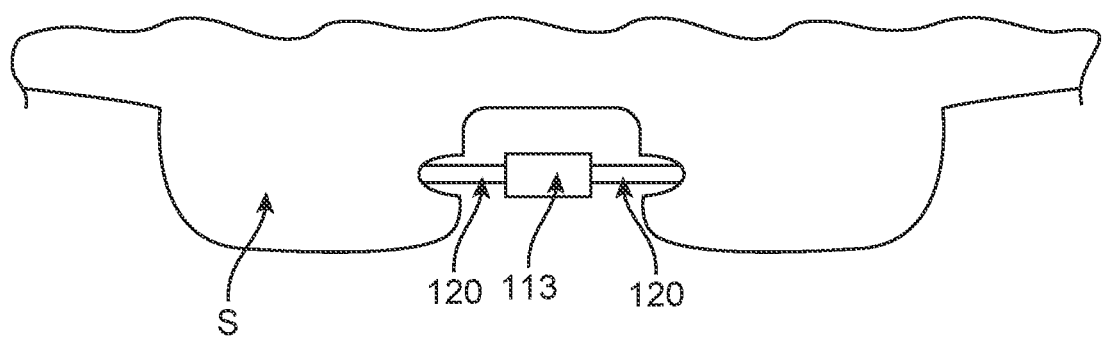
FIG. 5D shows side view of shoe grips extending from the pedal to interlock with a cyclist's shoe in a gripped or locked in position, in accordance with an embodiment of the present invention.

As illustrated in FIG. 3, the pedal 110 in some embodiments may have a body 111 with cavities 115 into which the shoe grips 120 (which may be located in the cyclist's shoe and/or in the pedal) may protrude or extend for gripping or locking in the cyclist's shoes. The pedal 110 also has a member 113 that may expand or contract to allow gripping or release of the shoe grips 120. A side view of shoe grips in a cyclist's shoe is shown in FIG. 4. A bottom view of the shoe grips 120 extending from a cyclist's shoe in a gripped or locked in position on the pedal 110 is shown in FIG. 5A, with the member 113 expanded. A view of the member 113 in a contracted position, thereby releasing the shoe grips 120 in the cyclist's shoe, is illustrated in FIG. 5B. In FIG. 5B, the dotted lines show an embodiment where the member 113 has expandable portions (i.e. shoe grips 120 in the pedal) that may be configured to extend and facilitate gripping of the cyclist's shoe. A side view of the shoe in gripped position is shown in FIG. 5C, corresponding to the bottom view of FIG. 5A, wherein the shoe grips 120 are locked in position below the member 113. A side view of the shoe in an alternative locked position is shown in FIG. 5D, where the shoe grips 120 (expandable portions of member 113) interlock with portions of the cyclist's shoe to lock-in the shoe to the pedal.

In some embodiments, the member 113 may comprise two halves that are forced apart to extend or brought together to retract the mechanism. In various embodiments, the extension may be effected by driving a wedge between the two halves using a linear mechanism. In some embodiments, the extension may be effected by a rotary mechanism, such as using a rotating cam configured to push the halves apart. In various embodiments, the retractable member may include a spring configured to counteract the actuation force.

In various embodiments, the system may include a battery to power the computing device 101 and the expansion and/or retraction of the member 113 of pedal 110. The battery in some embodiments may be conveniently rechargeable. In some embodiments, the retraction or extension of the member 113 may be actuated electrically by a suitable mechanism known in the art. In some embodiments, the actuation may be via a solenoid valve that uses linear motion with appropriate leverage such as a wedge to retract or extend the member 113. In some embodiments, the actuation may be via a cam mechanism that uses rotational motion converted to linear motion.

The invention in some embodiments may be used with a pedal 110 that "locks in" or "clips in" a portion of cyclist's shoe when the cyclist presses that portion against a pedal cavity. Alternatively, and ideally, the invention may be used with a pedal that has a slightly "delayed" clip in/lock in feature that may be programmed into computing device 101. When using a bicycle with a delayed clip in/lock in feature, the cyclist's shoe will not lock in with the pedal until the sensor 105-1 detects forward movement of the bicycle for a predetermined period of time (e.g. 1-2 seconds). For example, when the cyclist is braking, the sensor 105-1 reports the bicycle speed reduction to the computing device 101 via a signal, for releasing the cyclist's shoe from the pedal 110. In various embodiments, the sensor 105-1 may be an accelerometer. In various embodiments, the sensor 105-2 may be a gyroscope.

In various embodiments, the computing device 101 may be configured to release the shoe S based on a decrease in velocity exceeding a first threshold value—this may happen, for instance, when the bicycle is slowing down to a stop. In various embodiments, the computing device 101 may be configured to release the shoe S based on a rate of decrease in velocity exceeding a second threshold value—this may happen, for instance, when the cyclist applies the brake in order to stop quickly.

In various embodiments, the computing device 101 may be configured to release the cyclist's shoe S based on a change of angle exceeding a third threshold value—this may happen, for instance, when the cyclist is pedaling slowly and tilts the bicycle to dismount. In various embodiments, the computing device 101 may be configured to release the shoe S based on a rate of change of angle exceeding a fourth threshold value—this may happen, for instance, when the cyclist is thrown off balance for some reason (e.g., the bicycle's wheel runs over a rock, hole, or skids on a slick or wet surface) causing rapid tilting of the bicycle.

In some embodiments, the user device may be equipped with a software interface configured to communicate with the computing device 101. The software device could be used to accomplish any of several functions, such as for setting either the first, second, third or the fourth threshold value. This provides the cyclist with flexibility in using the device according to their needs. As already disclosed, in some embodiments, the software interface may also be used to issue a command to cause locking or release of the shoe from the pedal.

Figure 6:
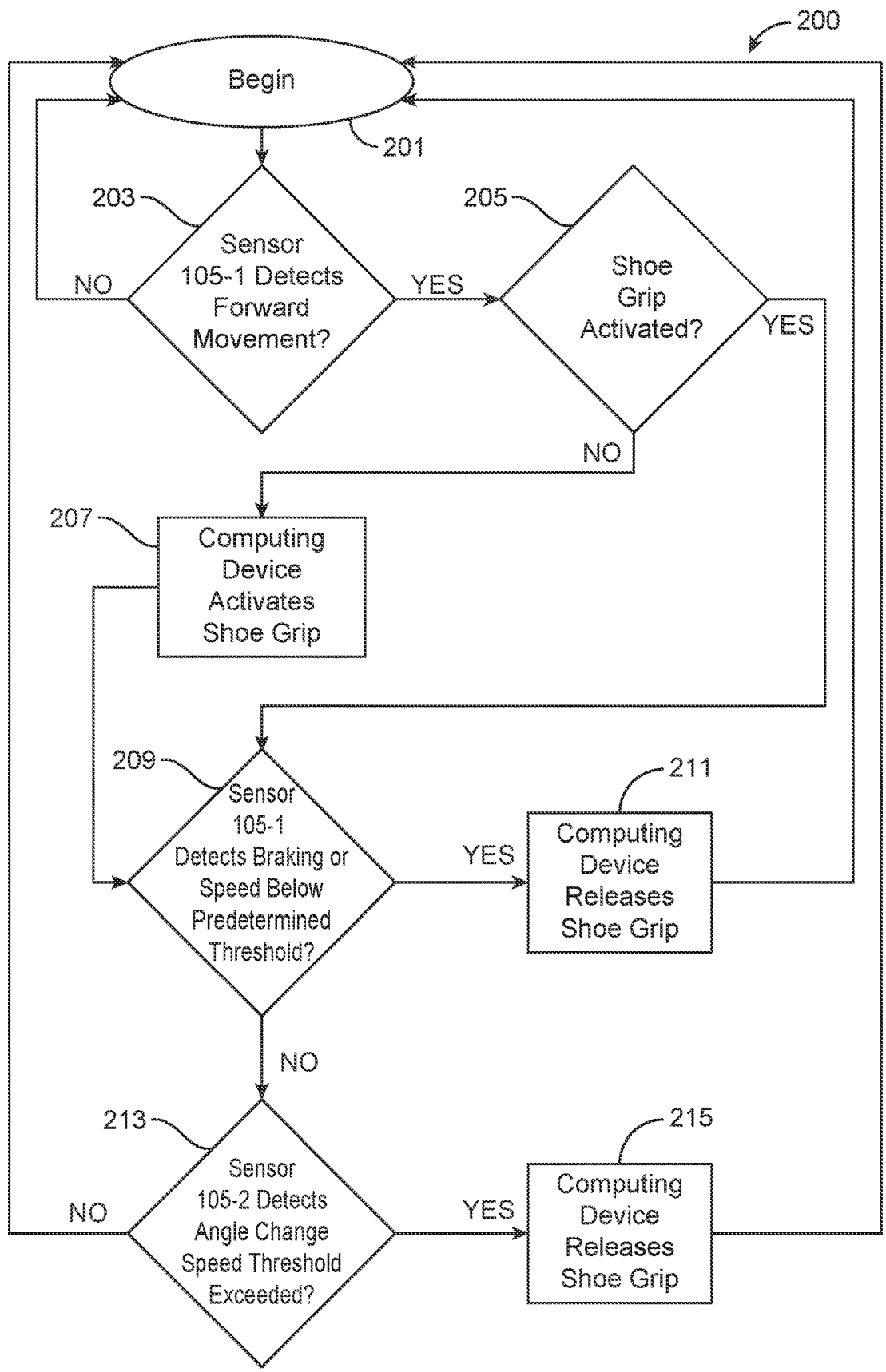
FIG. 6 illustrates a method of activation (gripping or lock-in) and release of a cyclist's shoe, in accordance with an embodiment of the present invention.

A method 200 of operating the computerized bicycle pedal lock-in and release system 100 is illustrated in FIG. 6. The system is brought to readiness in step 201 and once the sensor 105-1 detects forward movement in step 203, it transmits a signal indicating that forward movement to computing device 101. In step 205, computing device 101 then determines whether the shoe grips (which may be located in the cyclist's shoe or the pedal as described herein) have been activated or extended to lock in the cyclist's shoe. The computing device 101 may make this determination by, for example, reading a stored indication of the shoe grip status in a memory included in the computing device 101. The shoe grip status may, in some embodiments, be transmitted from a sensor in the cyclist's shoe S and/or the pedal 110. If the computing device 101 determines that the shoe grips have not been activated, in step 207 computing device 101 then issues a command to the pedal 110 to activate the member 113 to expand to grip the shoe grips 120 in the cyclist's shoe and thereby lock the cyclist's shoe in place. Alternatively, in step 207, the computing device 101 issues a command to the pedal 110 to activate member 113 to extend its retractable portions or halves to interlock with one or more portions of the cyclist's shoe and thereby lock the cyclist's shoe in place. In step 205, if computing device 101 determines that the shoe is already gripped or locked in, the computing device may proceed to step 209. In step 209, if the sensor 105-1 detects braking or speed below a predetermined threshold, the method proceeds to step 211 where the computing device 101 issues a command to the pedal to release the shoe grips. In step 209, if no braking or speed below a predetermined threshold is detected, the method proceeds to step 213, where sensor 105-2 detects whether or not the bicycle's angle change or angle change speed is above a predetermined threshold. If the bicycle's angle change or angle change speed has exceeded the predetermined threshold, in step 215 the computing device 101 issues a command to the pedal 110 to release the shoe grips 120.

The shoe grip 120 may comprise, for example, one or more protrusions that extend from the sole of the cyclist's shoe and interlocks with one or more protrusions on the pedal. Alternatively, the shoe grip 120 may comprise, for example, one or more protrusions that extends from the pedal and interlocks with one or more protrusions or cavities on the cyclist's shoe. In each respective case, the shoe grip 120 is advantageously capable of extending or retracting on receipt of a command from the computing device 101 to lock the cyclist's shoe in place or to release the cyclist's shoe, respectively.

In various embodiments, the sensors 105-1 or 105-2 may be located on the bicycle (for example, the handlebar or one or both of the bicycle's pedals), or integrated with the cyclist's watch, phone, another mobile device carried or worn by the cyclist, or the cyclist's clothing (including the cyclist's helmet or shoes). In various embodiments, the computing device 101 may be attached to the bicycle, or be part of the bicycle itself (e.g. integrated on the handlebar or on one or both of the pedals).

The sensor 105-1 is configured to detect deceleration of the bicycle during a certain interval of time (which may be predetermined or configurable using the user device or computing device 101) before the bicycle stops, so that the computing device 101 sends a command to the pedal 110 instructing it to release the cyclist's shoe. This way, the cyclist may safely and more easily remove their shoes from the pedals without having to twist their ankles (which is required in conventional "lock-in" pedal systems) thereby better avoiding a fall or potential injury to their ankles.

The sensor 105-2 also detects when the bicycle is falling. Typically, cyclists fall to the bicycle's left side, the bicycle's right side, or over the bicycle's handlebar. For example, if $d\theta/dt$ (the angle change speed) exceeds a predetermined threshold, the computing device 101 may perceive the change in sensor input as a fall signal. The computing device is configured to send a command to the pedal instructing it to release the cyclist's shoe in response to a fall signal.

In some embodiments, optionally, the bicycle pedal lock-in and release features described above may be implemented based on commands manually entered into the computing device 101 by the cyclist.

The invention has many advantages as set forth here. The system can be bought as a set and attached to any bike. The shoe grips may be configured in different models to conform to existing bike shoes or pedals, or with the use of one or more adaptors.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope. Further, the examples herein are not to be construed as limiting the scope of the invention, which will be as delineated in the claims appended hereto.

What is claimed is:

1. A system for locking and release of a shoe by a bicycle pedal, comprising:
    a computing device;
    one or more sensors for detecting a change of velocity of a bicycle, a rate of change of velocity of the bicycle, a change of angle of the bicycle with respect to a vertical axis, and a rate of change of angle of the bicycle with respect to a vertical axis; and
    a bicycle pedal with a retractable member, wherein the bicycle pedal is connected to the bicycle,
    wherein the retractable member is configured to lock the shoe by extending one or more portions of the retractable member in response to a command from the computing device based on a first input from the one or more sensors, wherein the first input from the one or more sensors comprises an indication of (a) forward movement of the bicycle for a predetermined period of time, (b) a velocity of the bicycle exceeding a predetermined velocity, and (c) a rate of change of angle of the bicycle with respect to a vertical axis below a predetermined rate of change of angle,
    and wherein the retractable member is further configured to release the shoe by retracting the one or more portions of the retractable member in response to a command from the computing device based on a second input from the one or more sensors.

2. The system of claim 1, wherein the computing device is connected to the one or more sensors with a wired or a wireless connection.

3. The system of claim 2, wherein the wireless connection uses a WiFi protocol or a Bluetooth protocol.

4. The system of claim 1, wherein the one or more sensors for detecting a change of velocity of the bicycle and a rate of change of velocity of the bicycle comprises an accelerometer.

5. The system of claim 1, wherein the one or more sensors for detecting a change of angle of the bicycle with respect to a vertical axis and a rate of change of angle of the bicycle with respect to a vertical axis comprises a gyroscope.

6. The system of claim 1, wherein the second input from the one or more sensors comprises an indication of at least one of
    a decrease in velocity of the bicycle exceeding a first threshold value;
    a rate of decrease in velocity of the bicycle exceeding a second threshold value;
    a change of angle of the bicycle with respect to a vertical axis exceeding a third threshold value; and
    a rate of change of angle of the bicycle with respect to a vertical axis exceeding a fourth threshold value.

7. The system of claim 6, further comprising a user device with a software interface configured to communicate with the computing device for setting the first, second, third and fourth threshold value, and to issue a command to cause locking or release of the shoe from the pedal.

* * * * *